Figure 1:
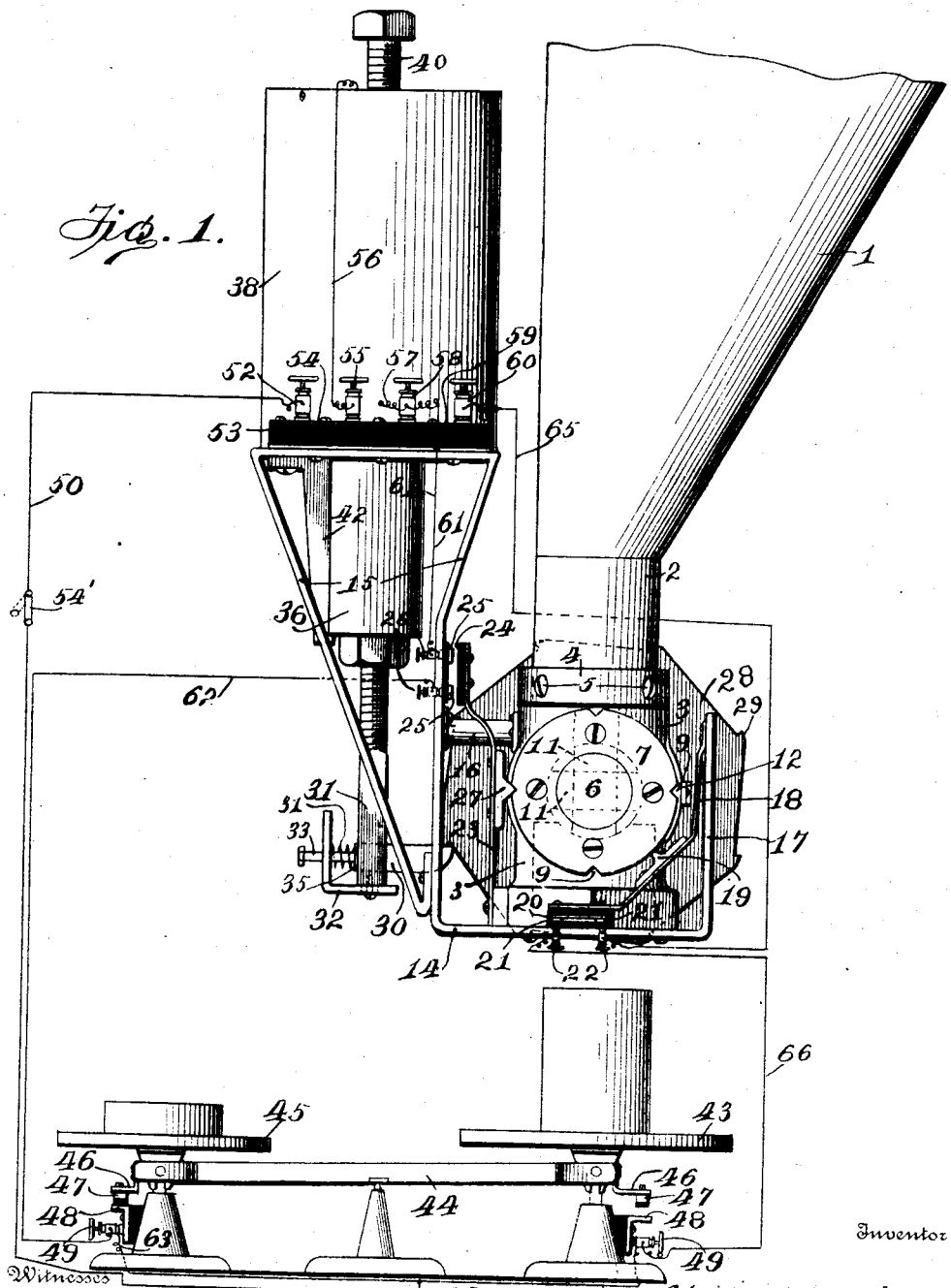

No. 832,236. PATENTED OCT. 2, 1906.
E. A. CARMICHAEL.
WEIGHING APPARATUS.
APPLICATION FILED AUG. 9, 1905.

2 SHEETS—SHEET 1.

Witnesses
A. L. Kitchin
Edgar M. Kitchin

Inventor
Edwin A. Carmichael
By Mason, Fenwick, Lawrence
Attorneys

No. 832,236. PATENTED OCT. 2, 1906.
E. A. CARMICHAEL.
WEIGHING APPARATUS.
APPLICATION FILED AUG. 9, 1905.
2 SHEETS—SHEET 2.
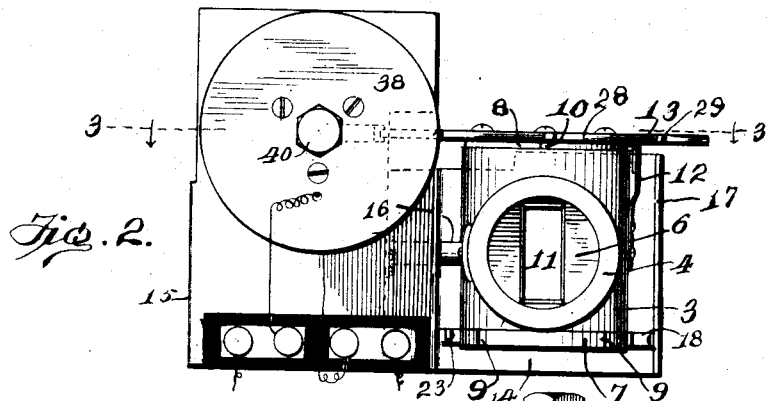
Fig. 2.
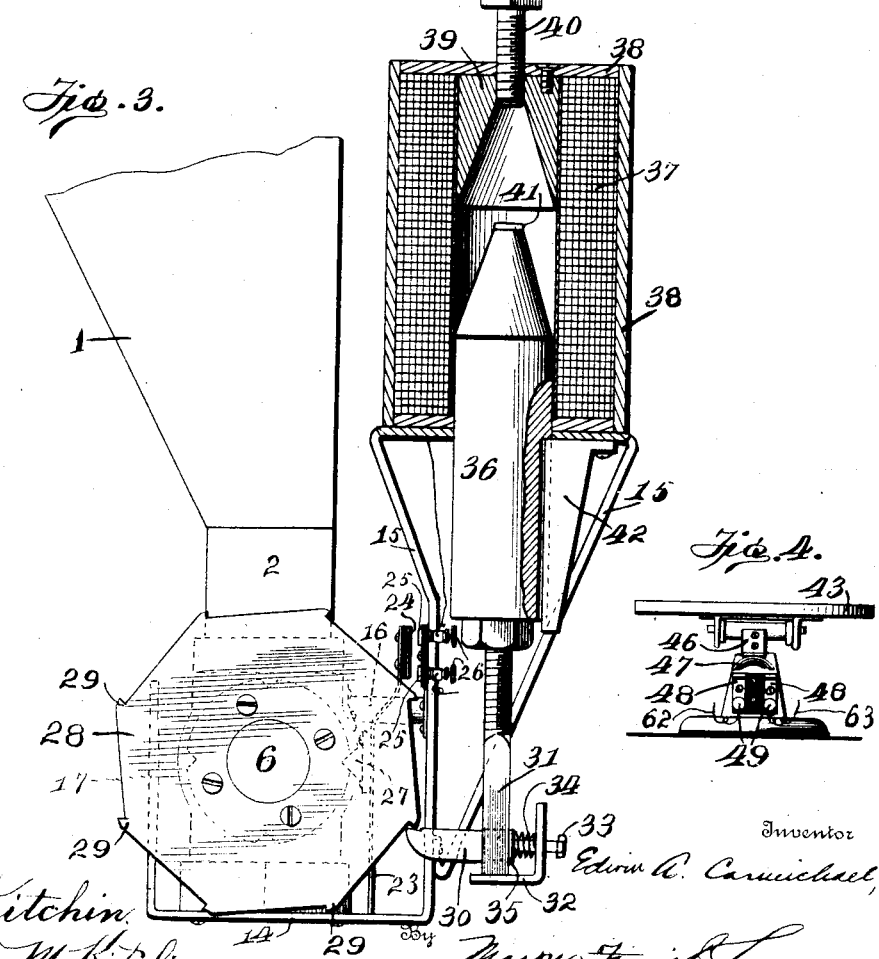
Fig. 3.
Fig. 4.
Witnesses
A. L. Kitchin
Edgar M. Kitchin
Inventor
Edwin A. Carmichael,
By Mason, Fenwick & Lawrence
Attorneys

UNITED STATES PATENT OFFICE.

EDWIN A. CARMICHAEL, OF OMAHA, NEBRASKA.

WEIGHING APPARATUS.

No. 832,236.      Specification of Letters Patent.      Patented Oct. 2, 1906.

Application filed August 9, 1905. Serial No. 273,428.

*To all whom it may concern:*

Be it known that I, EDWIN A. CARMICHAEL, a citizen of the United States, residing at Omaha, in the county of Douglas and State of Nebraska, have invented certain new and useful Improvements in Weighing Apparatus; and I do hereby declare the following to be a full, clear, and exact description of the invention, such as will enable others skilled in the art to which it appertains to make and use the same.

This invention relates to weighing apparatus, and more particularly to an automatically-operating feed-control governed by the scale of the weighing apparatus.

The invention comprises the combination, with a scale and a container for supplying material to be weighed by said scale, of a valve governing the discharge from said container, means for alternately throwing said valve to a closed and an opened position, and means carried by said scale for governing said valve-throwing means.

The invention comprises certain other novel constructions, combinations, and arrangements of parts, as will be hereinafter described and claimed.

In the accompanying drawings, Figure 1 represents a view in side elevation of a weighing apparatus embodying the features of the present invention. Fig. 2 represents a top plan view thereof, the hopper being omitted. Fig. 3 represents a longitudinal vertical section taken on the plane of line 3 3 of Fig. 2 and looking in the direction indicated by the arrow. Fig. 4 represents a detail view of one end of the scale, illustrating one of the scale-switches.

Referring to the drawings by numerals, 1 indicates a hopper or other suitable container provided with the usual spout or nozzle 2, with which is connected a valve-casing 3 by means of an annular flange 4, which projects upwardly from said casing and through which are passed screws or other attaching means 5 5. The valve-casing 3 is of the cylindrical type and is opened at its upper and lower ends, the upper end registering with the spout 2. A valve 6 is journaled transversely in the casing 3, and said valve projects through the casing at one end and carries a disk 7, fitting snugly against the end of the casing 3 and retaining the valve against longitudinal movement in one direction. The opposite end of the valve projects through the casing and carries a similar disk 8, which fits snugly against the end of the valve-casing 3 and prevents longitudinal movement of the valve in the other direction. The disk 7 is provided, preferably, with four notches 9 9, spaced apart equidistant about the periphery of the disk, and the disk 8 is provided with similar notches 10 10, similarly spaced and arranged at points in the longitudinal planes of the valve centrally between the notches 9. As indicated in dotted lines in Fig. 1, the valve 6 is provided with two discharging-passages 11 11, crossing at right angles, the notches 9 being arranged in line with the longitudinal plane of the valve midway between the contiguous ends of the passages 11 and the notches 10 being arranged opposite the center of the ends of said passages. The space on the periphery of the valve 6 between the contiguous ends of the passages 11 is sufficient for closing the hopper-spout 2, and a spring 12 is preferably fixed to the casing 3 and carries a preferably V-shaped block 13, adapted to engage the respective notches 10 for retaining the valve in a closed condition when closed, said notches 10 being preferably V-shaped, so that when sufficient pressure is brought to bear upon the valve the same may rotate and lift the block 13 out of engagement with the respective notch 10 against the pressure of the spring 12.

A supporting-plate 14 is preferably fixed to the lower end of the valve-casing 3 and carries an upwardly-extending bracket 15, the bracket 15 being braced by suitable transverse stay 16, connected at one end to the valve-casing at a point near the upper end thereof and at the other end to the bracket 15. The plate 14 at the side opposite the bracket 15 is formed integral with or suitably secured to an upwardly-extending plate 17. A spring 18 is fixed at its upper end to the plate 17 near the upper end thereof and extends downwardly and is bent about disk 7 and carries a block 19, formed with a V-shaped projection, engaging the periphery of the disk 7 under the pressure of the spring 18, said V-shaped projection being designed to engage the notches 9, which are also preferably V-shaped, the notches and projection being thus shaped for facilitating release after the projection has entered the notch. Of course any more rounded formation of the projection and notch or other shape might be employed, so long as the function stated is procured. At the lower end of the spring 18 said spring carries a contact-block 20, preferably insulated from the spring and designed when the projection of plate 19 is riding on the periphery of the disk 7 to contact with a pair of contact-blocks 21 21, carried by and insulated from plate 14, said contact-blocks 21 being provided with suitable binding-posts 22 22, the spring 18 in operation serving to cause the plate 20 to lift the blocks 21 21 when the projection of plate 19 enters notch 9. A spring 23 is fixed at its lower end to the valve-casing 3 and extends upwardly therefrom past the disk 7 and carries at its upper end a contact-plate 24, insulated therefrom and designed at times to contact with switch-blocks 25 25, carried by and insulated from one of the bars of bracket 15, said blocks 25 being provided with binding-posts 26 26. The spring 23 carries intermediate its length a block 27, similar to block 19 and designed to operate in a similar manner, said block 27 being formed with a V-shaped projection adapted to enter the notches 9 as the same pass the point of said projection, said projection being adapted to ride upon the periphery of the disk 7 at all other times, the spring 23 being pressed outwardly while the said projection is riding upon the periphery of the disk and the contact-block 24 thus caused to contact with the blocks 25. When the projection of plate 27 enters the notch 9, the spring 23 is permitted to move inwardly, so as to break contact between the plate 24 and the blocks 25.

The valve 6 extends beyond the disk 8 and carries a ratchet-wheel 28, provided with peripheral teeth 29 29, adapted in operation to be engaged by a pawl 30, said pawl being horizontally longitudinally movably mounted in a vertical shaft 31. The shaft 31 carries a bracket 32 at its lower end, and the pawl 30 is formed with a stem 33, slidingly extending through said bracket, a spring 34 surrounding the stem 33 and being interposed between the bracket 32 and a shoulder 35 on the pawl 30. Said spring 34 is designed to retain the pawl 30 projected outwardly into engagement with the periphery of the ratchet-wheel 28 and to permit the said pawl to recede while passing the teeth 29. The shaft 31 extends upwardly to and engages a core 36, constituting a part of the solenoid. The core 36 is vertically movably mounted centrally within a coil 37, said coil being preferably inclosed in the soft-iron casing 38. The upper cap of the casing 38 carries a filling 39, which is preferably formed with a tapered bore, and a set-screw or bolt 40 being threaded through the upper head of the casing 38 and into the bore of the filling 39, said filling being preferably of magnetic material. The upper end of the core 36 is tapered to correspond with the tapered bore of the filling 39, and the upper end of the core 36 is preferably provided with a cap 41, of brass or other non-magnetic material, designed to prevent "sticking" of the core to the set-screw 40 or the surrounding parts.

In practice the screw 40 may be adjusted longitudinally in a direction for governing to a nicety the length of stroke of the core 36 under the magnetic influence of the coil 37. The coil 37 is mounted upon the bracket 15, and the core 36 passes through an aperture in said bracket and is provided with a longitudinal groove engaged by a feather carried by a plate 42 depending from the bracket 15, the groove in the core terminating at the desired point for limiting the downward movement of the core. Spaced beneath the valve 6 is a plate 43, supported by a balance-bar 44 of a pair of scales, the opposite end of said bar carrying the plate 45, adapted to receive a weight-block, the plate 43 being designed to receive the receptacle into which material is to be discharged from the container 1. Each of the plates 43 and 45 carries a bracket 46, and each of said brackets carries a spring-contact 47. (Best seen in Fig. 4.) Beneath each of the springs 47 are arranged contact-blocks 48 48, connected with binding-posts 49 49.

The apparatus is wired as follows: A wire 50 extends from one pole of the battery or other suitable source of electrical energy 51 to a binding-post 52, mounted upon a suitable block of insulation 53, secured to the bracket 15. Any ordinary switch 54' may be interposed in the length of a wire 50 for completely cutting out the circuit when desired. A conductor-plate 54 connects the binding-post 53 with the binding-post 55, and a wire 56 leads from the binding-post 55 to and is connected with one end of the winding of coil 37. A wire 57 connects with the other end of said winding and extends to the binding-post 58, carried by the block 53. The said post 58 is connected by a suitable plate 59 with the binding-post 60. A wire 61 leads from the binding-post 58 to one of the binding-posts 26, a wire 62 extending from the other of said binding-post 26 to one of the binding-posts 49 on the weight-plate side of the scale, a wire 63 leading from the other binding-post 49 to and connecting with a wire 64, leading to the opposite pole of battery 51 or any other suitable source of electric energy from that engaged by the wire 50. From the binding-post 60 extends a wire 65, which connects to one of the binding-posts 22, the other binding-post 22 being connected by a wire 66 with one of the binding-posts 49 and the other binding-post 49 being connected by wire 67 to the wire 64.

In operation a weight-block is placed upon the plate 45, the switch 54' of course being closed, and the contact 47, connected with said plate, closes contact between the corresponding blocks 48, which if the valve 6 is closed, so that the block 27 is at its outermost position and the plate 24, held thereby in contact with the blocks 25, permits current to flow from battery 51 or other source of electric energy through wire 50, binding-post 52, plate 54, binding-post 55, wire 56, solenoid-winding 37, wire 57, binding-post 58, wire 61, one of binding-posts 26, one of blocks 25, plate 24, the other block 25, the other binding-post 26, one of wires 62, one of binding-posts 49, one of blocks 48, spring 47, carried by the weight-block side of the scale, the other block 48, the other binding-post 49, the wire 63, and wire 64, back to the battery 59 or other source of electric energy. As soon as this circuit is completed the core 36 will be lifted, the pawl 30 engaging one of the teeth 29 of ratchet-wheel 28 and rotating the valve 6 at one step or a distance sufficient for causing one of the passages 11 to assume a position in alinement with the spout 2. Such movement of the valve 6 causes one of the notches 9 to register with the projection on the plate 27, which permits the plate 24 to move away from the blocks 25. The separation of the plate 24 from the blocks 25 breaks the circuit and releases the core 36, which drops of its weight into the position indicated in Fig. 1, all of the parts being in condition therein indicated, the projection on plate 19 being in engagement with the periphery of disk 7, and plate 20 thus held in contact with the blocks 21. A receptacle of course will have been positioned upon the plate 43, and material discharging from the container 1 through the open valve 6 is received on said plate, and said material continues to be deposited thereon until a sufficient quantity is discharged from the container for overbalancing the opposite end of the scale, which causes the contact 47 of the end of the scale-carrying plate 45 to ascend and the contact 47 of the plate 43 to descend, the circuit being closed as follows: from battery or other electrical source to wire 50, binding-post 52, plate 54, binding-post 55, wire 56, solenoid-winding 37, wire 57, binding-post 58, plate 59, binding-post 60, wire 65, one of the binding-posts 22, one of the blocks 21, plate 20, the other block 21, the other binding-post 22, wire 66, one of binding-posts 49, one of blocks 48, switch 47, the other block 48, the other binding-post 49, wire 67, and wire 64 to battery or other electrical source. The thus-closed circuit energizes the solenoid, and the core 36 is elevated, imparting a step to the ratchet-wheel 28, it being observed that the teeth 29 are spaced equidistant on the periphery of said ratchet-wheel, there being eight of said teeth to the valve having two passage-ways, or, in other words, a sufficient number of teeth are provided for causing each step to revolve the valve a distance either for opening the same or for closing the same. The circuit last recited will effect a rotation closing the valve, and the parts will remain in this condition until the material is removed from plate 43, it being observed that the second stroke of the core 36 has moved the disk 7 to a position wherein the projection on plate 19 lies within a notch 9 and the projection on plate 27 is resting upon the periphery of the disk 7, so that contact between plate 20 and blocks 21 is broken, and contact is made between plates 24 and blocks 25, whereby the parts are in condition for another operation similar to the first described. The weighing process may continue automatically, the operator simply placing and removing the receptacle receiving the material being discharged, it being noted that current is used only when the valve is opened or closed and not during the time material is being discharged and that the valve is rotated with a step-by-step movement alternately opening and closing the same.

The present improved weighing apparatus is designed for handling every type of material which will feed readily through the container or hopper; but it is especially well adapted for weighting quantities of liquid, as well as for weighing dry products—such, for instance, as cereals, sugar, and the like.

What I claim is—

1. In a weighing apparatus, the combination with a container, and a scale adapted to weigh the material discharged from said container, of a valve controlling the discharge from said container, a solenoid, means adapted to be actuated by similar impulses of the solenoid, for moving said valve alternately to an open and a closed position, means actuated by said valve for governing the energizing of said solenoid, and means actuated by said scale coöperating with the governing means for controlling the operation of said solenoid.

2. In a weighing apparatus, the combination with a container, of a beam-scale for weighing material discharged therefrom, of a valve controlling the discharge of said container, a ratchet-wheel connected with said valve, and electromagnetic means for rotating said ratchet-wheel with a step-by-step movement, each step alternately opening and closing the valve, and means carried by the opposite ends of the beam to similarly energize the rotating means.

3. In a weighing apparatus, the combination with a container, of a rotary valve for governing the discharge of material therefrom, means for actuating said valve, a solenoid-core for operating said actuating means, a solenoid-winding surrounding said core, a support for said winding, means for limiting the downward stroke of said core in one direction, and an adjustable stop for limiting the stroke of the core in the opposite direction, an energizing-circuit for said solenoid, and means controlled by the rotation of the valve for making the energizing-circuit.

4. In a weighing apparatus, the combination with a container, of a valve governing the discharge of material therefrom, means for actuating said valve, a solenoid for operating said actuating means, said solenoid being provided with a core, a non-magnetic tip for one end of said core, and an adjustable stop designed to be struck by said tip when the core arrives at the extreme of its movement in one direction, an energizing-circuit for said solenoid and means controlled by the rotation of the valve for making the energizing-circuit.

5. In a weighing apparatus, the combination with a container, and a scale for weighing material delivered therefrom, of a solenoid governed by said scale, a rotary valve controlling the discharge from said container, a ratchet-wheel connected with said valve, an arm projecting from the core of the solenoid, and a longitudinally-movable pawl carried by and extending transversely of said arm, and normally projecting into engagement with said ratchet-wheel.

6. In a weighing apparatus, the combination with a container, and a scale for weighing material delivered therefrom, of a valve for controlling the discharge from said container, a ratchet-wheel connected with said valve, a solenoid governed by said scale, an arm projecting from the core of said solenoid, a pawl arranged transversely of said arm and mounted to move longitudinally, and a spring pressing the free end of said arm into engagement with said ratchet-wheel.

In testimony whereof I affix my signature in presence of two witnesses.

EDWIN A. CARMICHAEL.

Witnesses:
H. G. HOEL,
F. J. HOEL.